Figure 1:
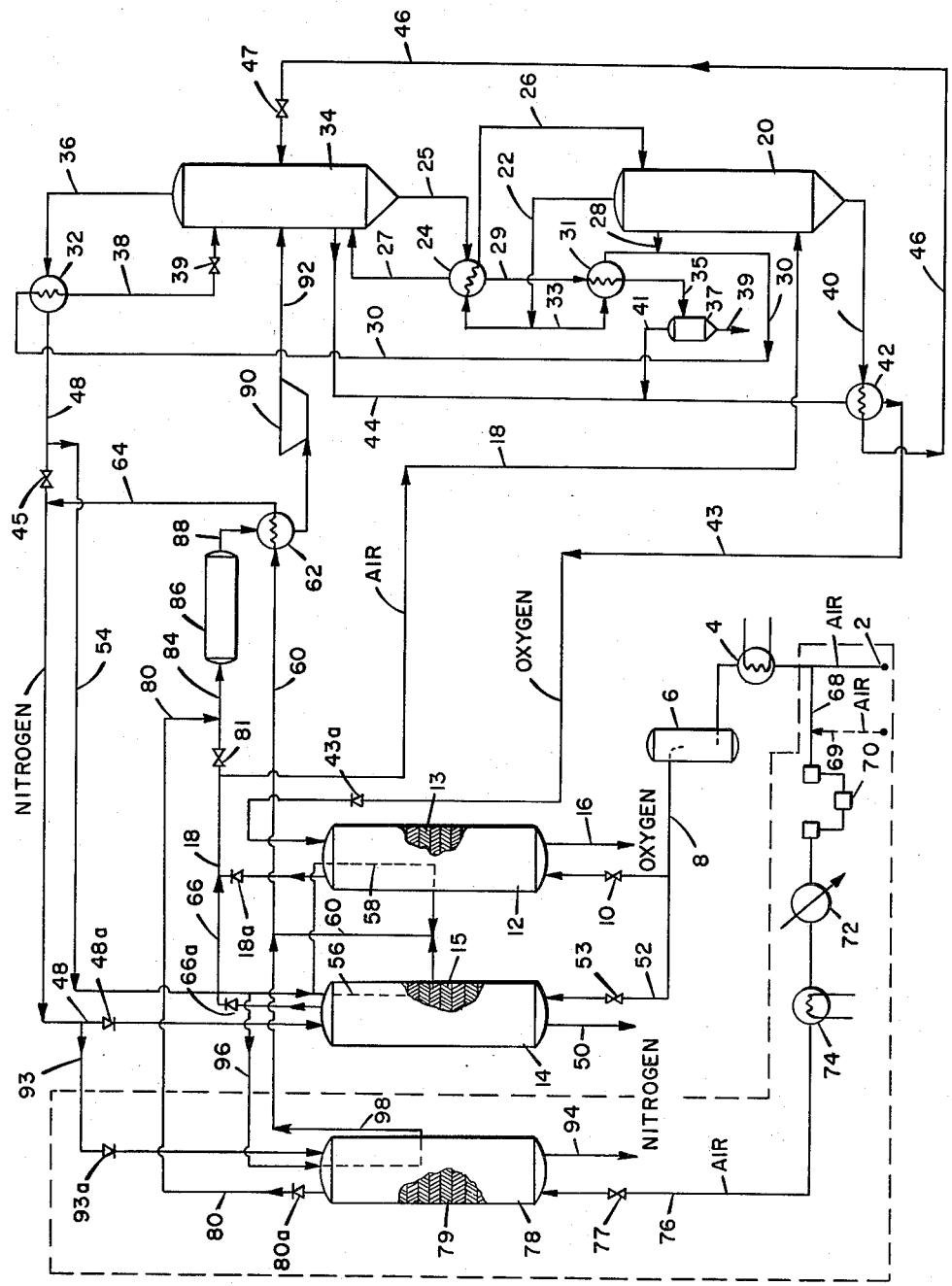

2,996,890
METHOD FOR SEPARATION OF GAS MIXTURES
Robert L. Baldner and Frank G. Pearce, Tulsa, Okla., assignors to Pan American Petroleum Corporation, Tulsa, Okla., a corporation of Delaware
Filed Mar. 28, 1957, Ser. No. 649,049
6 Claims. (Cl. 62—11)

This invention relates to a method for separating the components of gas mixtures. More particularly, it is concerned with a novel method for improving the refrigeration efficiency of a conventional gas separation plant design such as, for example, the sepation of oxygen and nitrogen by the fractionation of liquid air.

The major expense in the production of tonnage oxygen by fractionation of liquid air is the power required for air compression. In a two-tower system with the low pressure tower operating at about 20 p.s.i.a., the minimum air compressor discharge pressure to allow condensation and fractionation in the high pressure tower is about 50 p.s.i.g. In spite of this fact most plants operate with compressor discharge pressures in excess of 100 p.s.i.g. Pressures of this order are used for two reasons:

(1) to limit reboiler size to a practical value, and
(2) to obtain a high expansion ratio so that refrigeration per unit of air expanded is high.

In a plant where refrigeration is obtained by expansion into the low pressure tower, it is very important that the amount of air expanded be minimized because oxygen recovery decreases with increased air flow directly to the low pressure tower. This factor and not reboiler sizing, usually establishes the pressure to which the air should be compressed.

Frequently oxygen plants employed to produce tonnage oxygen are of a relatively inflexible design. For example, the insulation and regenerators or reversing exchangers may be less efficient than calculated. Consequently, the refrigeration requirement for a specified air flow to the plant must be higher than anticipated. To obtain the needed refrigeration it is necessary to use high air compressor discharge pressures, although the reboilers may be capable of condensing the air at much lower compressor discharge pressure. Often times only a small fraction of the heat transfer surface in the reboilers is required. When such a condition exists, a large amount of power must be used in the main air compressor to obtain a high compressor discharge pressure in order to realize more refrigeration output from the expander. However, providing additional refrigeration in this manner is not economical and requires larger utility facilities, such as steam, cooling water, etc.

Accordingly, it is an object of our invention to provide a method and apparatus by which the refrigeration efficiency of a conventionally designed tonnage oxygen plant, for example, can be materially increased. It is another object to improve the refrigeration efficiency of an oxygen plant by compressing the air, passing through the expander for refrigeration purposes, to a higher pressure than the air stream going to the high pressure tower. In this manner the discharge pressure of the main air compressor can be lowered until the heat transfer surface of the low pressure tower reboiler is completely utilized.

In carrying out our invention the flow of cold air is split into a major portion, for example, about 60 to 80 percent and a minor stream of about 20 to 40 percent of the overall air supply charged. With units which require not more than about 15 percent of the total plant air to be diverted to the expanders and low pressure tower to satisfy refrigeration requirements, the cost of using a booster or auxiliary compressor generally becomes uneconomical since the gain in oxygen recovery does not compensate for the additional expense of raising the pressure on the diverted stream. However, when it becomes necessary to divert about 20 percent or more of the plant air to the expander, the improvement in oxygen recovery that can be realized by the use of our invention more than offsets the cost of the additional compressor. The entire air stream to the plant is first compressed to a moderate pressure, for example, 50 to 80 p.s.i.g., after which said major portion is passed into reversing cold exchangers in the usual way, ultimately flowing to the high pressure fractionating tower which, together with the low pressure tower, yield separate streams of substantially pure oxygen and nitrogen by fractionation. The pressure of the aforesaid minor stream is further increased by means of a second compressor. Actually an increase in refrigeration efficiency can be obtained merely by increasing the pressure of said minor stream only a few pounds. In general, however, we prefer to increase the pressure of such stream up to about 100 to 150 p.s.i.g. The resulting compressed stream is thereafter cooled to about 60° F. and then introduced into a separate cold exchanger where the temperature of said minor stream is lowered to about −250° to −260° F. This cold air stream next passes to an expander where its pressure is reduced with work to a pressure of about 20 p.s.i.a. and its temperature lowered to about −300° F. This cold air stream then flows into a suitable cold fractionation tower to supply the refrigeration necessary to carry out satisfactory distillation and separation of nitrogen from oxygen by use of the aforesaid two-tower system. By obtaining the required refrigeration in this way, compressor power is conserved since only a minor part of the overall process air is compressed to the high pressure required for efficient expander operation. Also, as will be shown below, the quantity of substantially pure oxygen produced in accordance with our invention is substantially greater in terms of air compressor power consumption than can be achieved through conventional designs.

Figure 2:
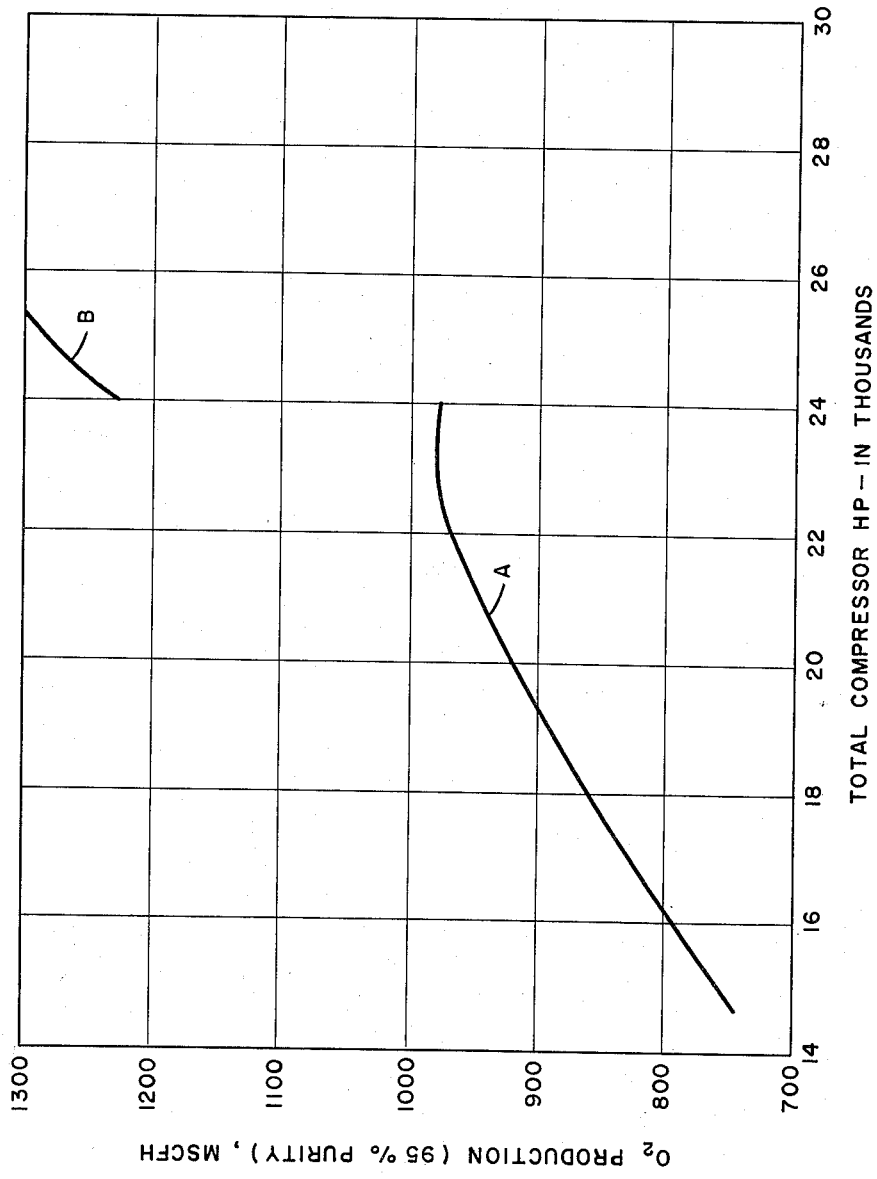

Our invention may be further illustrated by reference to the accompanying drawings in which FIGURE 1 is a flow diagram of a conventional tonnage oxygen plant to which has been added our improved design generally designated by the dotted lined enclosure. FIGURE 2 is a graph showing the increase in oxygen plant capacity in terms of air compressor horsepower required per unit of oxygen produced in the case of the present invention compared with the conventional plant on the same basis.

Referring again to FIGURE 1, air compressed to about 60 p.s.i.g. is brought into the system through line 2, cooled to about 60° F. in exchanger 4 and then injected into surge drum 6 where compressor oil and other impurities are removed. The air then moves through line 8 to valve 10 where it enters either cold exchanger 12 or an identical unit depending upon the cycle. In this connection discussion of the flow diagram in FIGURE 1 involves only one cycle for the sake of simplicity. Thus, it will be apparent that while air flows into cold exchanger 12, no oxygen will be flowing simultaneously therethrough via line 16. Just prior to the flow of air through exchanger 12, containing cold metal packing 13, the flow of product oxygen through line 16 is diverted to an identical exchanger, not shown, and through which air has just passed on its way to the fractionating section. Air flowing through exchanger 14 and over cold metal packing 15 leaves via line 66 and check valve 66a and is sent to high pressure tower 20 through line 18.

Cold air issues from exchanger 12, passes through line 18 and check valve 18a to a lower section in high pressure tower 20 operating at a pressure of about 60 p.s.i.g. The compressed air in tower 20 at a temperature of about −265° F., rises upwardly and is contacted by a decending stream of liquid reflux. Vapors are taken overhead through line 22, sent through reboiler 24 where they are brought into indirect heat exchange with liquid oxygen introduced into the reboiler as low pressure tower bottoms through line 25. A portion of the resulting condensate is then returned to tower 20 as reflux via line 26 while a vapor oxygen stream is returned to low pressure tower 34 via line 27. Part of the liquid oxygen in reboiler 24 flows through line 29 into product evaporator 31 where the oxygen comes into indirect heat exchange with a portion of the overhead vapors from tower 20. The stream flowing in line 22 is split with a minor portion thereof going through line 33, evaporator 31, line 30 and eventually to the top of tower 34 via line 38. The liquid oxygen flowing through evaporator 31 is transferred via line 35 to flash drum 37 maintained at a temperature of about −290° F. where higher boiling impurities such as acetylene are continuously purged from the system through line 39. Product oxygen is transferred to main product oxygen stream 44 via line 41. Oxygen then flows from the system through line 43, check valve 43a, exchanger 12 and line 16.

From the top of tower 20 a stream of liquid nitrogen is withdrawn through line 28 introduced into line 30, passed into indirect heat exchange in exchanger 32 with nitrogen vapors flowing from low pressure tower 34 via line 36. The resulting liquid nitrogen (−305° F.) stream in line 38 enters tower 34 via expansion valve 39 as liquid serving as reflux in the fractionation operation in progress in tower 34. Bottoms from tower 20 consisting of liquid containing about 40 percent oxygen is transferred through line 40 and heat exchanged in exchanger 42 with oxygen vapors in line 44. This bottoms fraction is then transferred via line 46 and expansion valve 47 to column 34 comprising a liquid feed thereto.

Product nitrogen from tower 34 is withdrawn through line 36, as previously mentioned, and then taken from exchanger 32 through line 48, control valve 45, check valve 48a, to cold exchanger 14 and on out the system via line 50. While product nitrogen at about −270° F. is flowing into exchanger 14, metal packing 15 in exchanger 14 is being regenerated for passage of a subsequent charge of cooled compressed air via line 52 and valve 53.

In operation of cold exchangers 12 and 14, substantial amounts of the higher boiling impurities in air, for example, water vapor and carbon dioxide, are removed from the entering warm air stream. Obviously, if the flow of entering air remains uninterrupted the exchanger will eventually become plugged with these solid higher boiling impurities. The latter, however, can be readily improved by periodically alternating the flow of warm air and backward flowing cold product oxygen or nitrogen streams through the exchanger. Thus, during one part of the cycle when air is being cooled, water and carbon dioxide are precipitated in the exchanger. However, before such an accumulation has become substantial enough to stop the flow of air, the latter is shut off and a countercurrently flowing product gas stream is introduced at the cold end of the exchanger and flows over the solidified carbon dioxide and ice to re-evaporate them and carry these impurities out of the system. Simultaneously in a second regenerated cold exchanger entering warm air is cooled and impurities precipitated therefrom on the cold metal packing therein through which returning product gas has previously been flowing. It is generally understood that the re-evaporation automatically is carried out with that product of the separation which is not desired to be recovered in the pure state.

In any event the water and carbon dioxide impurities deposited in cold exchangers are substantially completely removed only if conditions influencing complete re-evaporation of the impurities are effectively maintained throughout the region, or regions, of the apparatus containing deposits of these materials. These conditions relate specifically to a provision for a sufficient volume of gas into which the deposits can be evaporated and removed, and to the maintenance of a sufficient vapor pressure of the deposited impurities as is governed by the temperature of the backward-returning product gas in the region of said deposited impurities.

Specifically, prevention of plugging in the cold ends of exchangers 12 and 14 is accomplished by what is normally referred to as "unbalanced flow." Thus a portion of the cold product nitrogen in line 48 is bled off through line 54 where the stream therein divides and passes simultaneously through lines 56 and 58 which eventually join, taking both streams through line 60. The pressure on the upstream side of control valve 45 is generally about 20 p.s.i.a. whereas it is only 18 to 18.5 p.s.i.a. on the downstream side, thereby promoting the flow of nitrogen through the unbalance system. Nitrogen in line 60 then flows through exchanger 62 and line 64 which empties into line 48. By the flow of nitrogen through exchangers 12 and 14, as just described, the temperature differences between the cold air stream leaving the exchangers and the cold product nitrogen or oxygen streams entering the exchangers is less, thus making possible the more efficient removal of solid carbon dioxide.

Up to this point a typical tonnage oxygen plant flow diagram has been described. The following description shows how our invention can be integrated into such a plant to improve the refrigeration efficiency thereof. A portion, usually from 20 to 40 percent, of the total air stream, which is already at a pressure of about 60 p.s.i.g., is taken off from line 2, via line 68 and sent to compressor 70 where the pressure of the air stream therein is increased to about 125 p.s.i.g. Alternately, a separate air line, shown as dotted line 69, may be used to supply air to compressor 70 instead of splitting the flow in line 2. After coming from the compressor the temperature of the air is reduced in cooler 72 and then further reduced to about 60° F. in chilling unit 74, generally operated with Freon or some other suitable material. The compressed air (60° F.) is then taken along line 76 and valve 77 to a third exchanger 78 which likewise operates in periodic alternating flows of air and cold nitrogen or oxygen. The air, after it gives up its heat to cold metal packing 79, comes out of the exchanger through line 80 and check valve 80a and then flows through line 84 to adsorber 86 where the last traces of impurities such as carbon dioxide are removed by a suitable adsorbent material, for example, silica gel. Generally it is desirable to regulate the flow of air in line 80 so that a portion thereof is diverted through control valve 81 into line 18. In this way additional refrigeration can be supplied to the system merely by stopping or decreasing the flow of air through valve 81, without having to increase the air flow through line 80. This cold air stream, under a pressure of about 125 p.s.i.g. then flows from adsorber 86 through line 88, exchanger 62, and into expander 90.

In the expander the pressure of the compressed air is reduced with the performance of work to about 20 p.s.i.a.

and its temperature is lowered to about −300 to −305° F. In this expanded condition the air is taken from the expander through line 92 and introduced as vapor feed into low pressure tower 34. Treatment of the feed and contents of tower 34 from this point on has already been described.

Referring again to cold exchanger 78, it may be cooled down or regenerated by diverting a stream of cold nitrogen from line 48 through line 93, check valve 93a, over metal packing 79 and out of the system via line 94. This stream picks up heat in the exchanger from the previous flow of warmer air therethrough and passes from the system as a gas at about 50° F. Temperature control of the cold end of the exchanger is effected in a fashion similar to that in which the temperatures of the streams flowing into exchangers 12 and 14 are regulated. Thus, a portion of the nitrogen stream flowing in line 54 is diverted through line 96, exchanger 78, line 98 after which it rejoins the "unbalance stream" from exchangers 12 and 14 in line 60.

FIGURE 2 is a graph showing the improvement in oxygen production efficiency possible by the use of our invention. In this figure efficiency is expressed in terms of horsepower required for the air compressors to produce 95 percent oxygen. Curve A represents the capacity of a conventionally designed plant in which all of the incoming air is compressed to the same level and a portion thereof then sent to an expander before entering the low pressure fractionating tower. Even with the consumption of as much as 23,000 to 24,000 horsepower, it is apparent from FIGURE 2 that the quantity of 95 percent oxygen obtainable under the conditions represented by curve A could not be expected to go much above 975 m.c.f.h. On the other hand curve B shows that with the expenditure of 24,000 horsepower for operation of the air compressors, it is possible to produce 95 percent oxygen at the rate of about 1225 m.c.f.h., in accordance with our invention. At slightly less than 25,500 horsepower, it is possible to increase oxygen production to 1300 m.c.f.h.

One of the possible applications of our invention is in plants where the amount of required product oxygen is subject to rather wide variation. Thus, plants that can easily produce, for example, 200 tons of high purity oxygen per day need a substantial increase in available refrigeration to raise their capacity to 300 tons per day. Without drastic equipment changes, such as the substitution of larger regenerators, larger compressors, etc., it is doubtful that the required production increases can be met. By increasing the amount of air going to the expander and the low pressure tower the available refrigeration is, of course, increased. While this additional refrigeration permits an increased air flow to the plant, the cost of the gain in product oxygen is much higher because of the substantial oxygen loss into the product nitrogen stream and because of increased compressor operation cost. With our invention, however, an oxygen plant can operate efficiently over a rather wide capacity range. Thus, when increased quantities of air flow are required, the loss in refrigeration from the system via the out-flowing cold product gas stream can be made up by increasing the pressure on the aforesaid minor stream flowing to the expander and lower pressure tower as taught herein.

From the foregoing description it will be apparent that by our invention gas separation plants of more efficient and flexible design are now possible. Generally speaking, with prior art plants of this type the amount of available refrigeration is always a matter of considerable uncertainty. By the use of our invention, however, a very substantial amount of flexibility in available refrigeration is made possible owing to the use of the relatively small inexpensive auxiliary compressor and expander as taught herein.

We claim:

1. In a process for fractionating a gaseous mixture having components that can be readily separated by means of known low temperature fractionation techniques in which at least a portion of said mixture is first compressed, cooled, expanded, liquefied and evaporated in a fractionating system comprising high pressure and low pressure sections to supply the necessary refrigeration to said system for proper fractionation of said mixture, the improvement which comprises increasing the efficiency of said system by taking a minor portion corresponding to from about 20 to about 40 percent of said compressed mixture and compressing said minor portion to a pressure corresponding to from about 2 to about 3 times greater than the pressure of the remainder of said mixture cooling the compressed minor portion, next running said minor portion through an expansion engine to perform useful work, thereafter introducing the resulting cold vapors into said low pressure section and introducing the remainder of said compressed stream without further compression into said high pressure section.

2. The process of claim 1 in which the gaseous mixture is air.

3. In a process for separating oxygen from nitrogen present in an air stream by means of known low temperature fractionation techniques in which at least a portion of said stream is first compressed, cooled, expanded, liquefied and evaporated in a fractionating system comprising high pressure and low pressure sections to supply the necessary refrigeration to said system for proper fractionation of said stream, the improvement which comprises increasing the efficiency of said system by first compressing said stream to a pressure of about 50 to about 85 p.s.i.g., thereafter taking a minor portion corresponding to from about 20 to about 40 percent of the resulting compressed stream and compressing said minor portion to a pressure of about 100 to about 160 p.s.i.g., next running said portion through an expander to perform useful work cooling the compressed minor portion, thereafter introducing the resulting cold vapors into said low pressure section and introducing the remainder of said compressed stream without further compression into said high pressure section.

4. In a process for separating oxygen from nitrogen present in an air stream by means of known low temperature fractionation techniques in which at least a portion of said stream is first compressed, cooled, expanded, liquefied and evaporated in a fractionating system comprising high pressure and low pressure sections to supply the necessary refrigeration to said system for proper fractionation of said stream, the improvement which comprises increasing the efficiency of said system by first compressing said stream to a pressure of about 50 to about 85 p.s.i.g., thereafter taking a minor portion corresponding to from about 20 to about 40 percent of the resulting compressed stream and compressing said minor portion to a pressure of about 100 to about 160 p.s.i.g., cooling the resulting compressed minor portion by contacting the latter with a cold surface generated by previous contact of said surface with a cold fraction from said system, next running said portion through an expander to perform useful work introducing the resulting cold vapors into said low pressure section and introducing the remainder of said compressed stream without further compression into said high pressure section.

5. The process of claim 4 in which said cold fraction comes from the low pressure section of said system.

6. In a process for fractionating a gaseous mixture having components that can be readily separated by means of known low temperature fractionation techniques in which a portion of said mixture is first compressed, cooled, expanded, liquefied and evaporated in a fractionating system comprising high pressure and low pressure sections to supply the necessary refrigeration to said system for proper fractionation of said mixture, the improvement which comprises increasing the efficiency of said system by taking a minor portion of said compressed mixture and compressing said minor portion to a pressure corresponding to from about 2 to about 3 times greater than that of the pressure of the remainder of said mixture, cooling the compressed minor portion next running said minor portion through an expansion engine to perform useful work, thereafter introducing the resulting cold vapors into said low pressure section and introducing the remainder of said compressed stream without further compression into said high pressure section.

References Cited in the file of this patent

UNITED STATES PATENTS

| | | |
|---|---|---|
| 2,514,391 | Haynes | July 1, 1950 |
| 2,699,047 | Karwat et al. | Jan. 11, 1955 |
| 2,712,738 | Wucherer et al. | July 12, 1955 |
| 2,802,349 | Skaperdas | Aug. 13, 1957 |
| 2,873,583 | Potts et al. | Feb. 17, 1959 |

OTHER REFERENCES

"Gas Liquefaction and Separation," Davies, published by Longmans, Green and Company, Incorporated, New York, N.Y., pages 125 and 126 relied on.

UNITED STATES PATENT OFFICE
CERTIFICATE OF CORRECTION

Patent No. 2,996,890                                August 22, 1961

Robert L. Baldner et al.

It is hereby certified that error appears in the above numbered patent requiring correction and that the said Letters Patent should read as corrected below.

Column 3, line 17, for "decending" read -- descending --; column 6, line 62, after "work" insert -- thereafter --; column 7, line 7, strike out "that of".

Signed and sealed this 23rd day of January 1962.

(SEAL)
Attest:

ERNEST W. SWIDER                                         DAVID L. LADD
Attesting Officer                                            Commissioner of Patents